United States Patent
Tanaka et al.

(10) Patent No.: US 12,503,582 B2
(45) Date of Patent: Dec. 23, 2025

(54) INJECTION-MOLDED ARTICLE FOR MEDICAL USE

(71) Applicant: PRIME POLYMER CO., LTD., Tokyo (JP)

(72) Inventors: Yuya Tanaka, Chiba (JP); Yoshitaka Waga, Ichihara (JP); Nagisa Endo, Sodegaura (JP)

(73) Assignee: PRIME POLYMER CO., LTD., Tokyo (JP)

( * ) Notice: Subject to any disclaimer, the term of this patent is extended or adjusted under 35 U.S.C. 154(b) by 618 days.

(21) Appl. No.: 17/911,942

(22) PCT Filed: Mar. 19, 2021

(86) PCT No.: PCT/JP2021/011347
§ 371 (c)(1),
(2) Date: Sep. 15, 2022

(87) PCT Pub. No.: WO2021/193422
PCT Pub. Date: Sep. 30, 2021

(65) Prior Publication Data
US 2023/0133898 A1    May 4, 2023

(30) Foreign Application Priority Data
Mar. 27, 2020 (JP) ................. 2020-058435

(51) Int. Cl.
*C08L 23/16*    (2006.01)
(52) U.S. Cl.
CPC .................... *C08L 23/16* (2013.01)
(58) Field of Classification Search
CPC ....................................... C08L 23/16
USPC ........................................... 524/528
See application file for complete search history.

(56) References Cited

FOREIGN PATENT DOCUMENTS

| JP | 2013-053183 A | 3/2013 |
|---|---|---|
| JP | 2013-082828 A | 5/2013 |
| JP | 5441773 B | 3/2014 |
| JP | 2014-240458 A | 12/2014 |
| JP | 2015-044979 A | 3/2015 |
| JP | 2015193791 A * | 11/2015 |
| JP | 2018-100338 A | 6/2018 |
| JP | 2019-019289 A | 2/2019 |

OTHER PUBLICATIONS

Office Action issued in corresponding Chinese Patent Application No. 202180006834.1, dated Mar. 23, 2023.
Indian Office Action issued in connection with IN Appl. Ser. No. 202217041546 dated Feb. 20, 2023.

* cited by examiner

*Primary Examiner* — Deve V Hall
(74) *Attorney, Agent, or Firm* — Foley & Lardner LLP

(57) ABSTRACT

An injection-molded article for medical use obtained by using a medical propylene-ethylene-based resin composition including 88 to 95 parts by mass of a propylene-ethylene resin composition (A) that contains more than 90% and equal to less than 97% by mass of a propylene-ethylene copolymer (a) having an ethylene content of 1 to 5% by mass, and a melt flow rate conforming to JIS K7210 (230° C., 2.16 kg load) being 10 to 100 g/10-min, and equal to more than 3% and less than 10% by mass of a propylene-ethylene copolymer (b) having an ethylene content of 15 to 22% by mass and an MFR of 1 to 50 g/10-min, 5 to 12 parts by mass of an elastomer (B) that is an ethylene-α-olefin random copolymer which is an ethylene-α-olefin random copolymer having a density of 0.880 to 0.920 g/cm³; and 0.01 to 0.20 parts by mass of a weather-resistant stabilizer.

4 Claims, No Drawings

INJECTION-MOLDED ARTICLE FOR MEDICAL USE

CROSS-REFERENCE TO RELATED APPLICATIONS

The present application claims priority under 37 U.S.C. § 371 to International Patent Application No. PCT/JP2021/011347, filed Mar. 19, 2021, which claims priority to and the benefit of Japanese Patent Application No. 2020-058435, filed on Mar. 27, 2020. The contents of these applications are hereby incorporated by reference in their entireties.

TECHNICAL FIELD

The present invention relates to an injection-molded article for medical use using a transparent polypropylene resin composition.

BACKGROUND ART

Propylene-based polymers are excellent in molding processability, mechanical properties, and gas barrier properties, and are therefore molded by various methods. The molded articles are widely used in applications, such as food containers, caps, medical instruments, medical containers, daily necessities, automobile parts, electrical parts, sheets, films, and fibers.

Since the propylene-based resin composition used for applications such as a medical container is subjected to various sterilization treatments at the final stage, it is required to have resistance to these treatments. Commonly performed sterilization processes include high-pressure steam sterilization, ethylene-oxide-gas sterility, and radiation sterility. Radiation sterilization includes sterility by gamma ray irradiation and sterility by electron beam, especially ultraviolet irradiation.

Patent Documents 1 and 2 are known as such propylene-ethylene resin compositions for medical use.

Patent Document 1 describes a medical propylene-ethylene resin composition comprising a propylene-ethylene copolymer (A) by a Ziegler-catalyst system having an ethylene content of 0.1 to 3% by weight and a melt flow rate (MFR) conforming to JIS K7210 (230° C., 2.16 kg load) of 10 to 300 g/10-min, and a propylene-ethylene copolymer (B) by a Ziegler-catalyst system having an ethylene content of 5 to 20% by weight and an MFR of 1 to 50 g/10-min, wherein the weight ratio of the propylene-ethylene copolymer (A) to the propylene-ethylene copolymer (B) is 90:10 to 60:40, and the ethylene content of the medical propylene-ethylene resin composition is 2 to 8% by weight and an MFR of 20 to 100 g/10-min (claim 1 of Patent Gazette). The weight ratio of (A):(B) in the examples is 67:33 to 74:26, and the content of (B) is relatively large.

Patent Document 2 describes a medical propylene-ethylene resin composition comprising 51 to 99 parts by weight of a propylene-ethylene-based resin composition (A) that includes 90 to 60% by weight of a propylene-ethylene copolymer (a) having an ethylene content of 0.1 to 3% by weight, and a melt flow rate (MFR) conforming to JIS K7210 (230° C., 2.16 kg load) is 10 to 300 g/10-min, and 10 to 40% by weight of a propylene-ethylene copolymer (b) having an ethylene content of 5 to 20% by weight and an MFR of 1 to 50 g/10-min, and that the propylene-ethylene resin composition (A) has total ethylene content of 2 to 8% by weight and an MFR of 10 to 100 g/10-min (however, the total of (a) and (b) is 100% by weight), and 1 to 49 parts by weight of an elastomer (B) (however, the total of (A) and (B) is 100 parts by weight) (claim 1 of Patent Gazette). The ratio (a):(b) in the propylene-ethylene resin composition (A) in the examples is 67:33 to 72:28, and the content of (b) is relatively large.

PRIOR ART DOCUMENTS

Patent Document

Patent Document 1: JP 2015-44979 A (JP 6390231 B)
Patent Document 2: JP 2015-193791 A (JP 6497090 B)

SUMMARY OF INVENTION

Problems to be Solved by the Invention

Conventionally, a balance between transparency and impact resistance of a propylene-based resin composition has been ensured by blending a large amount of polymerized rubber or polyethylene (PE) component. However, there is a problem that the rigidity of the obtained propylene-based resin composition is lowered by blending a large amount of these blending components. Further, the decrease in rigidity causes a decrease in productivity, particularly a decrease in high-speed moldability in injection molding.

On the other hand, a composition having an excellent balance of transparency, impact resistance and rigidity by reducing the amount of polymerized rubber or PE component is not known. In particular, there is a strong demand for resin compositions suitable for medical applications, which are excellent in impact resistance and low elution after radiation sterilization.

In the present invention, by optimizing the composition of the propylene-based resin composition and the polymerized rubber or PE component to be blended, the targets of impact resistance and transparency can be achieved, and the rigidity and productivity can be improved. It is an object of the present invention to provide an injection-molded article for medical use using the improved propylene-based resin composition.

Means for Dissolving the Problems

The present invention includes the following aspects [1] to [3]:

[1] An injection-molded article for medical use that has been sterilized by g-ray or electron beam, wherein the injection-molded article obtained by using a medical propylene-ethylene-based resin composition including 88 to 95 parts by mass of a propylene-ethylene resin composition (A) that contains more than 90% by mass and equal to less than 97% by mass of a propylene-ethylene copolymer (a) having an ethylene content of 1 to 5% by mass, and a melt flow rate (hereinafter, abbreviated as MFR) conforming to JIS K7210 (230° C., 2.16 kg load) being 10 to 100 g/10-min, and equal to more than 3% by mass and less than 10% by mass of a propylene-ethylene copolymer (b) having an ethylene content of 15 to 22% by mass and an MFR of 1 to 50 g/10-min, (with the proviso that the total of (a) and (b) is 100% by mass), and 5 to 12 parts by mass of an elastomer (B) that is an ethylene-α-olefin random copolymer which is an ethylene-α-olefin random copolymer having a density of 0.880 to 0.920 g/cm$^3$ (with the proviso that the total of (A) and (B) being 100 parts by mass); and 0.01 to 0.20 parts by mass of a weather-resistant stabilizer.

[2] The injection-molded article for medical use according to [1], wherein the elastomer (B) is an ethylene-α-olefin random copolymer polymerized using a metallocene catalyst and having an MFR of 1 to 100 g/10 min in accordance with JIS K7210 (190° C., 2.16 kg load).

[3] The injection-molded article for medical use according to [1] or [2], wherein the medical propylene-ethylene-based resin composition further includes a nucleating agent Effect of the Invention The present invention can provide a propylene-ethylene-based resin composition capable of achieving the targets of impact resistance and transparency and improving rigidity and productivity even if the content of the propylene-ethylene copolymer (b) is lower than prior art. Can provide things. Further, this resin composition is suitable as an injection-molded article for medical use in which radiation sterilization is performed.

EMBODIMENTS OF THE INVENTION

Hereinafter, embodiments of the present invention will be described in detail, but these descriptions are examples of embodiments of the present invention, and the present invention is not limited to these contents.
[Propylene-Ethylene Copolymer (a)]
The propylene-ethylene copolymer (a) used in the present invention satisfies the following features 1a and 2a:
(Feature 1a: MFR)
The MFR of the propylene-ethylene copolymer (a) used in the present invention needs to be in the range of 10 to 100 g/10-min, preferably 20 to 60 g/10-min, more preferably. 20 to 40 g/10-min. When it is equal to or more than the lower limit of this range, the molding processability is improved due to the improvement of the fluidity. Particularly, even when the molded article having a wall thickness of 2.5 mm or less is molded, the molding orientation is difficult to be applied, and when an impact is applied to the molded article, it is possible to prevent cracks from occurring in the molding orientation direction. On the other hand, when the copolymer (a) having the MFR equal to or less than the upper limit, the productivity of the resin composition is good and economically preferable, and the impact resistance of the molded article after radiation sterilization is excellent.

The method of controlling the MFR value is well known, and it can be easily adjusted by adjusting the temperature and pressure which are the polymerization conditions and controlling the amount of hydrogenation added at the time of polymerization by a chain transfer agent such as hydrogen.

In the present invention, the MFR of the propylene-based resin is measured according to the A method and condition M (230° C., 2.16 kg load) of JIS K7210: 1999 "Plastic-Test method for melt mass-flow rate (MFR) and melt volume-flow rate (MVR) of thermoplastics", and its unit is g/10-min. Further, a method of adjusting MFR by CR (control rheology) of MFR using a molecular weight adjusting agent is generally known, but in the present invention, it is preferable to adjust MFR only by polymerization conditions without CR from the viewpoint of preventing the resin from burning of the resin derived from the elastomer at the time of molding.

(Feature 2a: Ethylene Content)
The ethylene content of the propylene-ethylene copolymer (a) used in the present invention needs to be in the range of 1 to 5% by mass, preferably 1.5 to 3.0% by mass. When the content is equal to or more than the lower limit of this range, the transparency of the molded article is good and the impact resistance after radiation sterilization is excellent.

Further, when the content is not more than the upper limit value of this range, the solidification at the time of molding becomes faster due to the increase of the crystallization temperature, and the molding processability becomes good. The ethylene content can be adjusted by controlling the monomer composition of propylene and ethylene at the time of polymerization.
[Propylene-Ethylene Copolymer (b)]
The propylene-ethylene copolymer (b) used in the present invention satisfies the following features 1b and 2b:
(Feature 1 b: MFR)
The MFR of the propylene-ethylene copolymer (b) used in the present invention needs to be in the range of 1 to 50 g/10-min, preferably 1 to 30 g/10-min, more preferably 1 to 20 g/10-min, most preferably 1 to 10 g/10-min. When the MFR is not less than the lower limit of this range, the dispersibility in the propylene-ethylene copolymer (a) is improved, and it is possible to suppress the generation of fish eyes in the molded article. Further, when it is not more than the upper limit value, the low crystal component is less likely to bleed on the surface, so that the drug adsorption property becomes good and the impact resistance after radiation sterilization becomes good. Further, although a method of adjusting MFR by CR (control rheology) of MFR using a molecular weight adjusting agent is generally known, in the present invention, it is preferable to adjust MFR only by polymerization conditions without CR from the viewpoint of preventing the resin from burning of the resin derived from the elastomer at the time of molding.
(Feature 2b: Ethylene Content)
The ethylene content of the propylene-ethylene copolymer (b) used in the present invention needs to be in the range of 15 to 22% by mass, preferably 15 to 21% by mass, more preferably 15 to 19% by mass, and further preferably 17 to 19% by mass. When it is not less than the lower limit value of this range, the impact resistance of the molded article after radiation sterilization is improved. When the value is not more than the upper limit value, the compatibility with the propylene-ethylene copolymer (a) is improved, so that the transparency of the molded article is improved, as well as the propylene-ethylene copolymer (b) is hardly to bleed on the surface of the molded article, so that stickiness and drug adsorption are improved.
[Propylene-Ethylene Resin Composition (A)]
As the mass ratio of the propylene-ethylene copolymer (a) to the propylene-ethylene copolymer (b) used in the present invention, it is necessary to contain the propylene-ethylene copolymer (a) with more than 90% by mass and equal to less than 97% by mass and the propylene-ethylene copolymer (b) with the range of 3% by mass or more and less than 10% by mass. Preferably, the mass ratio of the propylene-ethylene copolymer (a) is 91% by mass to 95% by mass, and the mass ratio of the propylene-ethylene copolymer (b) is 5% by mass to 9% by mass. When the lower limit of the mass ratio of the propylene-ethylene copolymer (a) is more than 90% by mass, the rigidity of the molded article and the light transmittance in water are improved, and when it is the upper limit of 97% by mass or less, the molded article is excellent in impact resistance.

The ratios of the propylene-ethylene copolymers (a) and (b) in the propylene-ethylene resin composition (A) are values obtained from the material balance at the time of polymerization in the case of continuous polymerization. When manufactured by blending, it is a value obtained from each composition ratio.

Further, each ethylene content is a value measured by using the $^{13}$C-NMR method.

The method for producing the propylene-ethylene copolymer (a) and the propylene-ethylene copolymer (b) used in the present invention is not particularly limited, and may be obtained by copolymerizing propylene and ethylene in the presence of a metallocene compound-containing catalyst or a Ziegler-Natta catalyst.

Regarding the production process of the propylene-ethylene copolymer (a) and the propylene-ethylene copolymer (b), any method may be used as long as the above-mentioned characteristics are satisfied. Regarding the mixing of the propylene-ethylene copolymer (a) and the propylene-ethylene copolymer (b), it may be produced by any method as long as the above-mentioned characteristics are satisfied.

[Elastomer (B)]

The propylene-ethylene resin composition of the present invention includes an elastomer (B) which is an ethylene-α-olefin random copolymer having a density of 0.880 to 0.920 g/cm$^3$. The elastomer (B) is preferably an ethylene-α-olefin random copolymer polymerized using a metallocene catalyst and having an MFR of 1 to 100 g/10 min according to JIS K7210 (190° C., 2.16 kg load). The elastomer (B) may be used alone or in combination of two or more thereof.

The content ratio of the propylene-ethylene resin composition (A) and the elastomer (B) is 88 to 95 parts by mass for the propylene-ethylene resin composition (A) and 5 to 12 parts by mass for the elastomer (B). The propylene-ethylene resin composition (A) is dispersed in a small amount of the elastomer (B). The propylene-ethylene resin composition (A) is preferably 90 to 95 parts by mass, and the elastomer (B) is preferably 5 to 10 parts by mass. Within this range, the resin composition has excellent high-speed moldability and impact resistance after irradiation.

The ethylene-α-olefin random copolymer is a random copolymer-elastomer of ethylene and an α-olefin having 3 or more and 20 or less carbon atoms. Specific examples of the α-olefin having 3 or more and 20 or less carbon atoms include propylene, 1-butene, 1-pentene, 1-hexene, 4-methyl-1-pentene, 1-heptene, 1-octene, 1-decene, 1-dodecene, 1-tetradecene, 1-hexadecene, 1-eikosen and the like.

These α-olefins can be used alone or in combination. Among these, propylene, 1-butene, 1-hexene and 1-octene are particularly preferably used. Further, when α-olefins are used in combination, it is preferable to combine propylene and 1-butene. The details of the ethylene-α-olefin random copolymer and the ethylene-propylene-butene random copolymer are described below.

[Ethylene-α-Olefin Random Copolymer]

Among the elastomers (B) used in the present invention, the morphology of the material is changed by containing a specific amount of the ethylene-α-olefin random copolymer, and impact resistance can be further improved while maintaining properties of the transparency, low odor, rigidity and low foreign matter appearance.

Such an ethylene-α-olefin random copolymer is an ethylene-α-olefin random copolymer having a density of 0.880 to 0.920 g/cm$^3$, preferably 0.880 to 0.915 g/cm$^3$. Examples of α-olefins include propane, 1-butene, 1-pentene, 1-hexene, 4-methyl-1-pentene, 3-methyl-1-pentene, 1-heptene, 1-octene, 1-decene and the like.

Specific examples of the ethylene-α-olefin random copolymers include ethylene-propylene random copolymer, ethylene-1-butene random copolymer, ethylene-1-pentene random copolymer, ethylene-1-hexen random copolymer, ethylene-4-methyl-1-pentene random copolymer, ethylene-3-methyl-1-pentene random copolymer, ethylene-1-hepten random copolymer, ethylene-1-octene random copolymer and ethylene-1-decene random copolymer.

The ethylene-α-olefin random copolymer can be used those having glass transition temperature (Tg) of −130° C. to −20° C., but the Tg is generally considerably lower than that of a propylene-based polymer, so attempts have been made to blend the copolymer into the propylene-based polymer to improve the impact resistance after irradiation while maintaining transparency, but the results did not exceed expectations. However, the combined use of the propylene-ethylene resin composition (A) and the elastomer (B) of the present invention can be expected to have an excellent effect.

The melt flow rate according to JIS K7210 (190° C., 2.16 kg load) (hereinafter it may be abbreviated as MFR (190° C.)) of the ethylene-α-olefin random copolymer is preferably 1 to 60 g/10-min, more preferably 2 to 40 g/10-min. Within this range, the mixed state of the propylene-ethylene resin composition (A) constituting the medical propylene-ethylene resin composition and the ethylene-α-olefin random copolymer (elastomer (B)) is good. Therefore, it is possible to stably obtain a medical propylene-ethylene resin composition having excellent transparency and a good balance of physical properties.

When the propylene-ethylene resin composition (A) and the ethylene-α-olefin random copolymer are mixed, the smaller the MFR difference between the propylene-ethylene resin composition (A) and the ethylene-α-olefin random copolymer, the more the ethylene-α-olefin random copolymer tends to exist as a slightly dispersed domain in the propylene-ethylene resin composition (A), which is desirable because the transparency is improved.

Specifically, the MFR ratio expressed by MFR (190° C.) of the ethylene-α-olefin random copolymer/MFR of propylene-ethylene resin composition (A) is preferably 0.05 to 1.2, more preferably 0.1 to 1.0. It is expected that this range is also significant in order to properly exhibit the functions of the present invention as a medical molded article, such as transparency, contamination with foreign substances, and prevention of odor.

The density of the ethylene-α-olefin random copolymer is preferably 0.880 to 0.920 g/cm$^3$, more preferably 0.880 to 0.915 g/cm$^3$. When an ethylene-α-olefin random copolymer is blended with the propylene-ethylene resin composition (A), the transparency may be deteriorated. However, if the ethylene-α-olefin random copolymer having the smaller density difference from the propylene-ethylene resin composition (A) and the MFR ratio expressed by MFR (190° C.) of the ethylene-α-olefin random copolymer/MFR of propylene-ethylene resin composition (A) that is close to 0.5 is used, the tendency of deterioration of transparency can be alleviated and the impact resistance can be improved. Here, the density is a value measured according to JIS K7112.

Such an ethylene-α-olefin random copolymer can be produced by using a catalyst for a stereoregular polymerization of olefins and polymerizing in the coexistence of ethylene and α-olefin while adjusting the molecular weight. Specifically, the ethylene-α-olefin random copolymer can be produced by reacting ethylene with α-olefin such as propylene, 1-butene, 1-hexene, 4-methyl-1-pentene and 1-oxtene, using a catalyst such as a Ziegler catalyst, a Phillips catalyst, or a metallocene catalyst as the catalyst for the stereoregular polymerization of olefins, by the process such as a gas phase method, a solution method, a high-pressure method, and slurry method. In particular, in order to reduce the Mw/Mn and the density, the ethylene-α-olefin random copolymer is desirably produced by using the metallocene catalyst as the catalyst for the stereoregular polymerization of olefins and in the high-pressure method or the solution method.

Further, the ethylene-α-olefin random copolymer selectively used in the medical propylene-ethylene resin composition of the present invention is used alone or in combination of two or more as long as the effect of the present invention is not impaired. can do.

Such ethylene-α-olefin random copolymers are commercially available products such as NOVATEC™ LL series and HARMOREX™ series manufactured by Nippon Polyethylene Corporation, KERNEL™ series, and TOUGHMER™ P series and TOUGHMER™ A series manufactured by Mitsui Chemicals Inc., EVOLUE™ series manufactured by Prime Polymer Co., Ltd., SUMIKATHENE™ E, EP series, and EXCELLEN™ GMH series manufactured by Sumitomo Chemicals Co., Ltd. can be exemplified.

As ethylene-α-olefin random copolymers polymerized using a metallocene catalyst, HARMOREX™ series and kernel series manufactured by Nippon Polyethylene Corporation, EVOLUE™ series manufactured by Prime Polymer Co., Ltd., and EXCELLEN™ FX series manufactured by Sumitomo Chemical Co., Ltd., and the like can be exemplified.

In the medical propylene-ethylene propylene-based resin composition of the present invention, the content ratio when the ethylene-α-olefin random copolymer as the elastomer (B) is blended into the propylene-ethylene resin composition (A) is 88 to 95 parts by mass for the ethylene-based resin composition (A), and 5 to 12 part by mass for the ethylene-α-olefin random copolymer, and preferably 90 to 95 parts by mass for the propylene-ethylene resin composition (A) and 5 to 10 parts by mass for the ethylene-α-olefin random copolymer. Within this range, the resin composition has excellent impact resistance after irradiation.

[Nucleating Agent]

When the medical propylene-ethylene resin composition of the present invention contains a nucleating agent, a molded article having better transparency can be obtained. The nucleating agent is not particularly limited, but a sorbitol-based nucleating agent, a phosphorus-based nucleating agent, a carboxylic acid metal salt-based nucleating agent, a polymer nucleating agent, an inorganic compound and the like can be used. As the nucleating agent, it is preferable to use the sorbitol-based nucleating agent, the phosphorus-based nucleating agent, or the polymer nucleating agent.

As the sorbitol-based nucleating agent, for example, nonitol 1,2,3-trideoxy-4,6:5,7-bis-O-[(4-propylphenyl)methylene] (commercially available product containing this compound, trade name "Mirrored NX8000 series, manufactured by Milliken ("NX8000" is the above chemical substance+ fluorescent whitening agent+blooming agent, "NX8000K" is "NX8000" without fluorescent whitening agent, "NX8000J" is "NX8000" without fluorescent whitening agent and blooming (Without both agents)), 1,3,2,4-dibenzylidene sorbitol, 1,3,2,4-di-(p-methylbenzylidene) sorbitol, 1,3-p-chlorobenzylidene-2,4-p-methylbenzylidene sorbitol can be used.

Examples of the phosphorus-based nucleating agent include sodium-bis-(4-t-butylphenyl)phosphate, potassium-bis-(4-t-butylphenyl)phosphate, and sodium-2,2'-ethylidene-bis-(4,6-di-t-butylphenyl)phosphate, sodium-2, 2'methylene-bis-(4,6-di-t-butylphenyl)phosphate, bis(2,4,8, 10-tetra-t-butyl hydroxy-12H-dibenzo[d, g][1,3,2] dioxaphosphocin-6-oxide) sodium salt (trade name "ADK STAB NA-11", manufactured by ADEKA CORPORATION), composite product of bis(2,4,8,10-tetra-t-butyl-6-hydroxy-12H-dibenzo[d, g][1,3,2]dioxaphosphocin-6-oxide)aluminum hydroxide salt as a main component (trade name "ADK STAB NA-21", manufactured by ADEKA CORPORATION), lithium-2,2'-methylene-bis (4,6-di-t-butylphenyl)phosphate and 12-hydroxystearic acid. A composite containing and containing lithium as an essential component (trade name "ADK STAB NA-71", manufactured by ADEKA CORPORATION) or the like can be used.

As the carboxylic acid metal salt nucleating agent, for example, p-t-butyl benzoic acid aluminum salt, aluminum adipate, and sodium benzoate can be used.

Branched α-olefin polymers are preferably used as the polymer nucleating agent.

Examples of the branched α-olefin polymers include homopolymers, or of 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, or copolymers thereof and further copolymers of them with other α-olefins. A polymer of 3-methyl-1-butene is particularly preferable from the viewpoints of good transparency, low-temperature impact resistance, rigidity, and economic efficiency.

As the inorganic compound, for example, talc, mica, and calcium carbonate can be used.

As described above, some of the nucleating agents used in the present invention can be easily obtained as commercial products.

Among these nucleating agents, nonitol 1,2,3-trideoxy-4, 6:5,7-bis-O-[(4-propylphenyl)methylene] and/or bis(2,4,8, 10-tetra-t-butyl-6-hydroxy-12H-dibenzo[d, g][1,3,2]dioxaphosphocin-6-oxide)aluminum hydroxide salt are preferable to use from the viewpoint of transparency, low temperature impact resistance, rigidity and low odor.

Further, these nucleating agents may be used alone or in combination of two or more.

[Weather-Resistant Stabilizer]

The medical propylene-ethylene resin composition of the present invention contains a weather-resistant stabilizer.

Specific examples of the weather-resistant stabilizer include phosphorus-based antioxidants such as bis(2,6-di-t-butyl-4-methylphenyl) pentaerythritol-di-phosphite, di-stearyl-pentaerythritol-di-phosphite, and bis(2,4-di-t-butylphenyl) pentaerythritol-di-phosphite, tris(2,4-di-t-butylphenyl) phosphite, tetrakis(2,4-di-t-butylphenyl)-4,4'-biphenylene-di-phosphonite, tetrakis(2,4-di-t-butyl-5-methyl-phenyl)-4,4'-biphenylene-di-phosphonite; n-hexadecyl-3,5-di-t-butyl-4-hydroxy-benzoate, 2,4-di-t-butylphenyl-3',5'-di-t-butyl-4'-hydroxybenzoate, bis(2,2,6, 6-tetramethyl-4-piperidyl) sevacate, ethanol condensate of dimethyl-2-(4-hydroxy-2,2,6,6-tetramethyl-1-piperidyl) succinate; hindered amine-based stabilizers such as poly{ [6-[(1,1,3,3-tetramethylbutyl)amino]-1,3,5-triazine-2,4-diyl][(2,2,6,6-tetramethyl-4-piperidyl)imino]hexamethylene[(2,2,6,6-tetramethyl-4-piperidyl)-imino]}, and N, N'-bis (3-aminopropyl)ethylenediamine-2,4-bis[N-butyl-N-(1,2,2, 6,6-pentamethyl-4-piperidyl)amino]-6-chloro-1,3,5-triazine condensate; phenol-based antioxidants such as 2,6-di-t-butyl-p-cresol, tetrakis[methylene-(3,5-di-t-butyl-4-hydroxyhydrocinnamate)]methane, 1,3,5-trimethyl-2,4,6-tris-(3,5-di-t-butyl-4-hydroxybenzyl)benzene, and tris(3,5-di-t-butyl-4-hydroxybenzyl) isocyanurate; thio-based antioxidants such as di-stearyl-β, β'-thio-di Examples thereof include propionate, di-myristyl-β,β'-thio-di-propionate, di-lauryl-β,β'-thio-di-propionate.

Incidentally, the weather-resistant stabilizer may be used singly or in combination of a plurality of them, the propylene-ethylene resin composition according to the present invention is preferably blended with phosphorus-based antioxidants or hindered amine-based stabilizers from the view point of color change after sterilization because it is used for an injection-molded article for medical use to be sterilized by radiation. Among the phosphorus-based antioxidants, tris(2,4-di-t-butylphenyl)phosphite is particularly preferable because it has an excellent balance between suppressing resin deterioration and discoloration during radiation sterilization. Among the hindered amine-based stabilizers, high-molecular-weight hindered amine-based stabilizers are preferable from the viewpoint of low elution, and ethanol condensate of dimethyl-2-(4-hydroxy-2,2,6,6-tetramethyl-1-piperidyl) succinate is particularly preferable because it has an excellent in balance of suppression of resin deterioration during radiation sterilization, long-term stability of the molded article after sterilization, and discoloration, and low elution. In addition, among the hindered amine-based stabilizers, the basicity of this compound is a weak and close to neutral, so that it has little effect on the content liquid and is preferable. It is most preferable to use a phosphorus-based antioxidant and a hindered amine-based antioxidant in combination from the viewpoint of suppressing resin deterioration during radiation sterilization and maintaining the long-term stability of the molded article after sterilization.

Further, in the medical propylene-ethylene resin composition of the present invention, amine-based antioxidants represented by the following formulae (3) and (4) which is no discoloration by radiation treatment, and excellent in a NOx gas discoloration resistance, lactone-based antioxidants such as 5,7-di-t-butyl-3-(3,4-di-methyl-phenyl)-3H-benzofuran-2-one, and vitamin E-based antioxidants such as the following general formula (5) may be blended as long as the effect of the present invention can be obtained.

[Chem. 1]

(3)

[Chem. 2]

(4)

(in formula, $R_1$ and $R_2$ are $C_{14}$-$C_{22}$ alkyl groups.)

[Chem. 3]

(5)

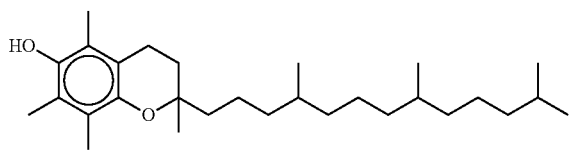

The blending amount of the weather resistance stabilizer is 0.01 to 0.20 mass with respect to 100 parts by mass of the medical propylene-ethylene resin composition. It is preferably 0.02 to 0.10 parts by mass. When it is 0.01 parts by mass or more, the effect as a weather-resistant stabilizer is sufficiently exhibited, and when it is 0.20 parts by mass or less, there is no adverse effect on transparency and the like.

[Other Additives]

Further, the medical propylene-ethylene resin composition of the present invention can contain other agents such as known copper damage inhibitors, ultraviolet absorbers, antistatic agents, hydrophilic agents, slip agents, anti-blocking agents, anti-fogging agents, colorants, fillers, petroleum resins, antibacterial agents and the like within the range not impaired in its performance.

[Method for Producing Medical Propylene-Ethylene Resin Composition]

The medical propylene-ethylene resin composition of the present invention is obtained by blending predetermined amount of various compounding components such as the above-mentioned propylene-ethylene copolymer (a), propylene-ethylene copolymer (b), elastomer (B), nucleating agent, neutralizing agent, lubricant, antioxidant, and other additives, by using a normal mixing device such as Henshell mixer (trade name), super mixer, ribbon blender, tumbler mixer, Banbury mixer. The resulting mixture can be made into a pellet-like composition by melt needling and pelletizing using a single screw extruder, a twin-screw extruder, a Banbury mixer, a plastic bender, a roll, or the like, at a melt-kneading temperature of 150 to 300° C., preferably 180 to 250° C.

[Molded Article]

The molded article of the present invention is an injection-molded article for medical use obtained by molding the above-mentioned medical propylene-ethylene resin composition by a known injection molding machine.

Since the resin composition of the present invention is excellent in molding processability at the time of injection molding, an injection-molded article with high accuracy can be obtained in a short molding cycle. The obtained injection-molded articles are used for a wide variety of medical applications, and specific molded articles include medical instruments and containers (disposable instruments such as disposable syringes and their parts, catheters/tubes, infusion bags, blood bags, vacuum blood collection tubes, non-woven fabrics for surgery, blood filters, blood circuits; parts of artificial organs such as artificial lungs and artificial anal; dialyzer, prefilled syringe, kit formulation, drug container, test tube, suture, base material of poultice, parts of dental material, parts of orthopedic material, contact lens cases, contact lens molds, PTP, SP/sachets, P vials, eye medicine containers, chemical liquid containers, long-term liquid storage containers, etc.), medical containers (infusion packs), and daily necessities (clothes cases, buckets, washbasins, writing utensils, etc.).

Since the molded article of the present invention is for medical use, it can be often sterilized, and examples of the sterility method include gas sterility (EOG), high-pressure steam sterility, and radiation sterility (γ-ray, electron beam). In particular, the molded article obtained by using this resin composition is suitable for radiation sterilization and has excellent impact resistance even after radiation sterilization. The radiation sterilization dose suitable for the present molded article is preferably 1 kGy to 100 kGy, and more preferably 10 kGy to 60 kGy. Depending on the product, sterilization can be performed when the dose is above the lower limit, and when the dose is below the upper limit, the balance between sterility, impact resistance and low elution after sterilization is excellent.

Further, from the viewpoint of transparency, the molded article using the present resin composition preferably has an average wall thickness of 3.0 mm or less, more preferably 2.5 mm or less, and further preferably 2.0 mm or less, particularly preferably 1.5 mm, more particularly preferably 1.2 mm or less, and most preferably 1.0 mm or less. Sufficient transparency is exhibited when the thickness is not more than the upper limit. Further, the average wall thickness of the molded article herein referred means to the wall thickness of the widest part as a percentage of the total surface area of the molded article. As a typical example, in a syringe (syringe or tubular part is called a barrel), it refers to the wall thickness of the cylindrical part of the outer cylinder (barrel).

Further, the present resin composition can provide an injection-molded article having a good balance between product rigidity and impact resistance. In addition, the present resin composition is suitable for artificial dialysis members because of satisfying the heavy metal test, lead test, cadmium test, and eluent test described in Yakuhatsu No. 494 Dialysis Artificial Kidney Device Approval Criteria, IV Blood Circuit Quality and Test Method after radiation sterility. Especially, the present resin composition is suitable for dialyzer housings and headers, and related members. Furthermore, the present resin composition is suitable for syringe members in order to satisfy the 6 chemical requirements described in JIS T3210: 2011 sterilized syringes, and especially suitable for disposable syringes.

EXAMPLES

Hereinafter, the present invention will be specifically described with reference to Examples, but the present invention is not limited to these Examples. In the following, the propylene-ethylene copolymers (a) and (b) are described as "PP component (a)" and "PP component (b)", and the propylene-ethylene resin composition may be described as "propylene-based polymer".

Production Example of Propylene-Based Polymer (A-1)

(1) Preparation of Solid Catalyst Component 95.2 g of anhydrous magnesium chloride, 442 mL of decane and 390.6 g of 2-ethylhexyl alcohol were heated and reacted at 130° C. for 2 hours to prepare a uniform solution. Thereafter, 21.3 g of phthalic anhydride was added to this solution, and the mixture was further stirred and mixed at 130° C. for 1 hour to dissolve phthalic anhydride.

After cooling the uniform solution thus obtained to room temperature, 75 mL of this uniform solution was added dropwise over 200 mL of titanium tetrachloride kept at −20° C. for 1 hour. After the charging is completed, the temperature of this mixed solution was raised to 110° C. over 4 hours, 5.22 g of diisobutyl phthalate (DIBP) was added when the temperature reached 110° C., and the mixture was stirred and kept at the same temperature for 2 hours.

After the reaction for 2 hours was completed, the solid part was collected by hot filtration, the solid part was resuspended in 275 mL of titanium tetrachloride, and then heated again at 110° C. for 2 hours. After completion of the reaction, the solid part was collected again by hot filtration and washed thoroughly with decane and hexane at 110° C. until no free titanium compound was detected in the solution.

Here, the detection of the free titanium compound was confirmed by the following method. 10 mL of the supernatant liquid of the above solid catalyst component was collected with a syringe and charged into 100 mL of Schlenk with a branch that the inside had been replaced with nitrogen in advance. Next, the solvent hexane was dried in a nitrogen stream and vacuum dried for another 30 minutes. 40 mL of ion-exchanged water and 10 mL of 50% by volume sulfuric acid were charged therein and stirred for 30 minutes. This aqueous solution was transferred through a filter paper to a 100-mL volumetric flask, followed by 1 mL of conc. $H_3PO_4$ as a masking agent for iron (II) ions and 5 mL of 3% $H_2O_2$ aqueous solution as a color-developing reagent for titanium were added, and the volume was further increased to 100 mL with ion-exchanged water. This measuring flask was shaken, and after 20 minutes, the absorbance at 420 nm was observed using UV to detect free titanium.

The washing and removal of the free titanium and the detection of the free titanium was repeated until the absorbance was no longer observed.

The solid titanium catalyst component (A) prepared as described above was stored as a decane slurry, and a part of the solid titanium catalyst component (A) was dried for examining the catalyst composition. The composition of the solid titanium catalyst component (A) thus obtained was 2.3% by mass of titanium, 61% by mass of chlorine, 19% by mass of magnesium, and 12.5% by mass of DIBP.

(2) Preparation of Catalyst Component for Pre-Polymerization:

After the inside of a three-necked flask with a stirrer and an internal volume of 500 mL was replaced with nitrogen gas, 400 mL of dehydrated heptane, 19.2 mmol of triethylaluminum, 3.8 mmol of dicyclopentyldimethoxysilane, and 4 g of the above solid titanium catalyst component (A) were charged. The internal temperature of the flask was maintained at 20° C., and propylene was introduced while stirring. After 1 hour, stirring was stopped, and as a result, a pre-polymerization catalyst component (B) in which 2 g of propylene was polymerized per 1 g of the solid titanium catalyst component (A) was obtained.

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethyl aluminum, and 0.6 mmol of dicyclopentyl dimethoxysilane. were charged. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.4 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 1.8% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.94 MPa-G, and then a mixed gas of propylene/ethylene: (4.3 L/min)/(1.1 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and subjected to solid-liquid separation. Further, the solid portion was washed twice with 6 L of heptane at 60° C. The propylene/ethylene copolymer thus obtained was vacuum dried.

When the index for the PP component (b) produced in the second stage was calculated, the production amount was 7% by mass based on the total weight, the MFR was 7.0 g/10-min, and the ethylene content was 18.0% by mass.

<Manufacturing of Propylene-Based Polymer (A-2)>

The steps (1) and (2) are the same as those of the propylene-based polymer (A-1).

(3-1) Polymerization-1 (Polymerization [Step 1])

A stainless-steel autoclave equipped with a stirrer and having an internal volume of 10 L was sufficiently dried, and after nitrogen substitution, 6 L of dehydrated heptane, 12.5 mmol of triethylaluminum, 0.6 mmol of dicyclopentyldimethoxysilane. were charged. After replacing the nitrogen in the system with propylene, hydrogen was charged at 0.15 MPa-G, and then propylene and ethylene were introduced with stirring the mixture. The introduction amount was adjusted so that the ethylene concentration in the gas phase portion in the polymerization tank was 1.4 mol %.

After the inside of the system was stabilized at an internal temperature of 80° C. and a total pressure at 0.8 MPa-G, 20.8 mL of a heptane slurry containing the above pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 1.8% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.90 MPa-G, and then a mixed gas of propylene/ethylene: (4.2 L/min)/(1.2 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. Propylene/ethylene copolymer thus obtained was vacuum dried.

When the index for the PP component (b) produced in the second stage was calculated, the production amount was 7% by mass based on the total weight, the MFR was 3.0 g/10-min, and the ethylene content was 19.0% by mass.

<Manufacturing of Propylene-Based Polymer (A-3)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, 0.6 mmol of dicyclopentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.4 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 1.8% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.92 MPa-G, and then a mixed gas of propylene/ethylene: (4.0 L/min)/(1.4 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. Propylene/ethylene copolymer thus obtained was vacuum dried.

When the index for the PP component (b) produced in the second stage was calculated, the production amount was 7% by mass based on the total weight, the MFR was 5.0 g/10-min, and the ethylene content was 21.0% by mass.

<Manufacturing of Propylene-Based Polymer (A-4)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.8 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 2.3% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.92 MPa-G, and then a mixed gas of propylene/ethylene: (4.0 L/min)/(1.4 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 7% by mass based on the total weight, the MFR was 5.0 g/10-min, and the ethylene content was 21.0% by mass.

<Manufacturing of Propylene-Based Polymer (A-5)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 2.3 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 3.0% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.92 MPa-G, and then a mixed gas of propylene/ethylene: (4.0 L/min)/(1.4 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 7% by mass based on the total weight, the MFR was 5.0 g/10-min, and the ethylene content was 21.0% by mass.

<Manufacturing of Propylene-Based Polymer (A-6)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.8 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 2.3% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.92 MPa-G, and then a mixed gas of propylene/ethylene: (4.0 L/min)/(1.4 L/min) was introduced. Propylene/ethylene copolymerization was carried out for 40 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 5% by mass based on the total weight, the MFR was 5.0 g/10-min, and the ethylene content was 21.0% by mass.

<Manufacturing of Propylene-Based Polymer (A-7)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.4 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 1.8% by mass.

<Manufacturing of Propylene-Based Polymer (A-8)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.4 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added, and propylene was continuously added. The polymerization was carried out at 80° C. for 3 hours while being supplied to the water.

The MFR of the PP component (a) was 45 g/10-min, and the ethylene content was 1.8% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.94 MPa-G, and then a mixed gas of propylene/ethylene: (3.8 L/min)/(1.6 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 7% by mass based on the total weight, the MFR was 7.0 g/10-min, and the ethylene content was 24.5% by mass.

<Manufacturing of Propylene-Based Polymer (A-9)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.8 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 2.3% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen 0.92 MPa-G was charged, and then a mixed gas of propylene/ethylene: (4.0 L/min)/(1.4 L/min) was introduced. Propylene/ethylene copolymerization was carried out for 70 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 9% by mass based on the total weight, the MFR was 5.0 g/10-min, and the ethylene content was 20.5% by mass.

<Manufacturing of Propylene-Based Polymer (A-10)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.45 MPa-G, and then propylene was introduced with stirring.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 180 g/10-min.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.92 MPa-G, and then a mixed gas of propylene/ethylene: (3.7 L/min)/(1.7 L/min) was introduced. Propylene/ethylene copolymerization was carried out for 60 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 8% by mass based on the total weight, the MFR was 5.0 g/10-min, and the ethylene content was 26.0% by mass.

<Manufacturing of Propylene-Based Polymer (A-11)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.4 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 1.8% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.92 MPa-G, and then a mixed gas of propylene/ethylene: (4.2 L/min)/(1.2 L/min) was introduced. Propylene/ethylene copolymerization was carried out for 100 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 12% by mass based on the total weight, the MFR was 5.0 g/10-min, and the ethylene content was 19.0% by mass.

<Manufacturing of Propylene-Based Polymer (A-12)>

The steps of (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.7 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 2.2% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen 0.90 MPa-G was charged, and then a mixed gas of propylene/ethylene: (4.4 L/min)/(1.0 L/min) was introduced. Propylene/ethylene copolymerization was carried out for 60 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 8% by mass based on the total weight, the MFR was 3.0 g/10-min, and the ethylene content was 16.5% by mass.

<Manufacturing of Propylene-Based Polymer (A-13)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.4 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 1.8% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.92 MPa-G, and then a mixed gas of propylene/ethylene: (4.0 L/min)/(1.4 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 7% by mass based on the total weight, the MFR was 5.0 g/10-min, and the ethylene content was 21.0% by mass.

<Manufacturing of Propylene-based Polymer (A-14)>

The steps (1) and (2) are the same as those of the propylene-based polymer (A-1).

(3-1) Polymerization-1 (Polymerization [Step 1])

A stainless-steel autoclave equipped with stirrer and having an internal volume of 10 L was sufficiently dried, and after nitrogen substitution, 6 L of dehydrated heptane, 12.5 mmol of triethylaluminum, and 0.6 mmol of dicyclo-pentyldimethoxysilane. was added. After replacing the nitrogen in the system with propylene, hydrogen was charged at 0.15 MPa-G, and then propylene and ethylene were introduced with stirring. The introduction amount was adjusted so that the ethylene concentration in the gas phase portion in the polymerization tank was 1.4 mol %.

After the inside of the system was stabilized at an internal temperature of 80° C. and a total pressure of 0.8 MPa-G, 20.8 mL of a heptane slurry containing the pre-polymerization catalyst component (B) with 0.10 mmol in terms of Ti atoms was added. The polymerization was carried out at 80° C. for 3 hours while propylene was continuously supplied.

The MFR of the PP component (a) was 45 g/10-min, and the ethylene content was 1.8% by mass.

(3-2) Polymerization-2 (Polymerization [Step 2])

After the polymerization of the PP component (a) was completed (after the above [Step 1]), the internal temperature was lowered to 30° C. and depressurized. Then, hydrogen was charged at 0.96 MPa-G, and then a mixed gas of propylene/ethylene: (4.9 L/min)/(0.5 L/min) was introduced. Propylene/ethylene copolymerization was carried out for 50 minutes at an internal temperature of 60° C. and a total pressure of 0.30 MPa-G (varies depending on the amount of introduced gas).

After a predetermined amount of time had elapsed, 50 mL of methanol was added to stop the reaction, and the temperature was lowered and depressurized. The entire contents were transferred to a filtration tank equipped with a filter, heated to 60° C., and solid-liquid separated. Further, the solid portion was washed twice with 6 L of heptane at 60° C. The propylene/ethylene copolymer thus obtained was vacuum dried.

When the index for the PP component (b) produced in the second stage was calculated, the production amount was 7% by mass based on the total weight, the MFR was 8.0 g/10-min, and the ethylene content was 9.0% by mass.

<Elastomer (B)>

As the elastomer (B), the following ethylene-α-olefin copolymers (B-1) to (B-3) were used.

(B-1) Metallocene-Based Ethylene-α-Olefin Copolymer:
Density (measured according to JIS K7112. Hereinafter, it may be abbreviated as density.): 903 kg/m$^3$,
MFR (190° C.): 15 g/10-min
(manufactured by Prime Polymer Co. Ltd., trade name: SP00206)

(B-2) Metallocene-Based Ethylene-α-Olefin Copolymer:
Density: 883 kg/m$^3$,
MFR (190° C.): 20 g/10-min
(manufactured by Mitsui Chemicals, Inc, trade name: A-2085S)

(B-3) Metallocene-Based Ethylene-α-Olefin Copolymer:
Density: 913 kg/m$^3$,
MFR (190° C.): 4.0 g/10-min
(manufactured by Prime Polymer Co. Ltd., trade name: SP1540)

[Granulation/Molding/Evaluation]
<Granulation/Molding>
(1) Granulation:

In the formulation shown in the Table (Examples/Comparative Examples), the propylene-based polymer (A), the elastomer (B), dimethyl-2-(4-hydroxy-2,2,6,6-tetramethyl-1-piperidyl) ethanol condensate ("TINUVIN 622" (trade name), manufactured by BASF) as the weather-resistant stabilizer, and nonitol 1,2,3-trideoxy-4,6:5,7-bis-O-[(4-propylphenyl)methylene] ("Mirrored NX8000J" (trade name), manufactured by Milliken) or (C-1): 2,2'-methylenebis(4,6-di-tert-butylphenyl)aluminum phosphate ("ADK STAB NA-21" (trade name), manufactured by ADEKA CORPORATION) as a nucleating agent were formulated in a predetermined amount, and then additives of 0.13 parts by mass of phosphorus-based antioxidant: tris(2,4-di-t-butylphenyl) phosphite ("Irgafos 168" (trade name) manufactured by BASF) and 0.10 parts by mass of a neutralizing agent: calcium stearate (NITTO KASEI CO., LTD.) were further stirred and mixed by a Henshell mixer.

The obtained mixture was melt-kneaded under the following conditions using a twin-screw extruder (TEM35BS) manufactured by TOSHIBA MACHINE CO., LTD. to obtain strands.

Model: TEM35BS (35 mm twin-screw extruder)
Screw rotation speed: 300 rpm
Screen mesh: #200
Resin temperature: 230° C.

The obtained strands were cut by a pelletizer after water cooling to obtain pellets of the propylene resin composition.

(2) 10 mL-Syringe Molding

A container was molded by the following method using the pellets of the propylene resin composition.

Pellets of the propylene-based resin composition were injection-molded into a 10 mL-syringe having a height of 80 mm, a diameter of 16 mm, and a side wall thickness of 1.0 mm, using an electric injection molding machine with a mold clamping force of 140 tons (NEX140IV manufactured by NISSEI PLASTIC INDUSTRIAL CO., LTD.), under the conditions of cylinder temperature: 230° C., mold temperature: 25° C., injection primary pressure: 130 MPa, injection speed: 50 mm/sec, holding pressure: 150 MPa, and holding time: 5.0 sec.

(3) High-Speed Moldability

In continuous molding under the above molding conditions, the minimum cycle time. that enables molding with free from troubles such as mold release failure between 100 shots, syringe deformation, and container flow direction damage due to the orientation of the elastomer resin, was measured.

<Physical Property Evaluation>
(4) MFR

The melt flow rates MFR of the propylene-ethylene copolymers (a) and (b) of the present invention and the propylene-ethylene resin composition (A) were measured according to JISK-7210-1999 (230° C., 2.16 kg-load), and the MFR of elastomer (B) was measured according to JISK-7210-1999 (190° C., 2.16 kg-load).

(5) Ethylene Content ($^{13}$C-NMR Measurement Conditions)

Measuring device: LA400-type nuclear magnetic resonance device manufactured by JEOL Ltd.
Measurement mode: BCM (Bilevel Complete decoupling)
Observation frequency: 100.4 MHz
Observation range: 17006.8 Hz
Pulse width: C nucleus 45° (7.8 μs)
Pulse repetition time: 5 seconds
Sample tube: 5 mmφ sample tube
Rotation speed: 12 Hz
Integration frequency: 20000 times
Measurement temperature: 125° C.
Solvent: 1,2,4-trichlorobenzene: 0.35 ml/Benzene-d6: 0.2 ml
Sample amount: Approximately 40 mg From the spectrum obtained by the measurement, the ratio of the monomer chain distribution (triad (triplet) distribution) was determined according to the following document (1), and the mole fraction (mol %) of the constituent unit derived from ethylene was determined (hereinafter referred to as E (mol %)) and the mole fraction (mol %) of the constituent unit derived from propylene (hereinafter referred to as P (mol %)) were calculated. The content (% by mass) of the constituent unit derived from ethylene of the propylene-ethylene copolymer (hereinafter E (wt %)) was calculated by converting the obtained E (mol %) and P (mol %) into mass % according to the following (Equation 1).

$$E(\text{wt \%}) = E(\text{mol \%}) \times 28 \times 100 / [P(\text{mol \%}) \times 42 + E(\text{mol \%}) \times 28] \quad \text{(Equation 1)}$$

Document (1): Kakugo, M.; Naito, Y.; Mizunuma, K.; Miyatake, T., Carbon-13 NMR determination of monomer sequence distribution in ethylene-propylene copolymers prepared with delta-titanium trichloride-diethylaluminum chloride. Macromolecules 1982, 15, (4), 1150-1152

(6) Tensile Modulus:

A test piece was molded by an injection molding method, and after molding, it was left in a constant temperature room adjusted to a room temperature of 23±5° C. and a relative humidity of 50±5% for 72 hours, and then the tensile modulus was obtained in compliance with JIS K 7161 (ISO178).

The tensile modulus after radiation sterilization was obtained by measuring as follows: After molding a 10-mL syringe, it was left in a constant temperature room adjusted to a room temperature of 23±5° C. and a relative humidity of 50±5% for 72 hours, γ-ray of 25 kGy (average dose) was irradiated under room temperature conditions and under an air atmosphere. After irradiating, the condition was further adjusted in a constant temperature room at room temperature of 23° C.±0.5° C. and relative humidity of 50±5% for 2 weeks, and then the measurement was performed.

(7) Impact Resistance of 10-mL Syringe (Weight-Drop Test)

The state of the 10-mL syringe was adjusted under the condition of 23° C. for 48 to 72 hours, and further the state was adjusted for 24 hours or more in an environment of 10° C.

In the environment of 10° C., an iron rod (13.5 mmφ, 120 g) was dropped vertically with respect to the center of the body of the syringe, and the maximum height at which cracks did not occur when dropped 10 times was measured.

In the weight-drop test after radiation sterilization, after molding a 10-mL syringe, the product was left in a constant temperature room adjusted to a room temperature 23±5° C. and a relative humidity of 50±5% for 72 hours, and then γ-ray of 25 kGy (average dose) was irradiated under room temperature conditions and under an air atmosphere. After irradiating, the state of syringe was further adjusted in a constant temperature room at room temperature of 23° C.±0.5° C. and relative humidity of 50±5% for 2 weeks, and then the measurement was performed.

(8) Transparency of 10 mL Syringe (Light Transmittance in Water)

With reference to 17th revised Japanese Pharmacopoeia Test 7.02 Plastic-made Drug Container Test Method 1.4 Transparency Test, the test was carried out by the following method:

From the height of the body of the container around 40 mm, cut 5 pieces into a size of about 0.9×4 cm, and immersed each in a water-filled UV absorption spectrum measurement cell, the transmittance of the cut piece at a wavelength of 450 nm was measured using a cell filled only with water as a control and determined by an ultraviolet visible absorptiometry.

The light transmittance in water after radiation sterilization was measured after molding a 10-mL syringe, the product was left in a constant temperature room adjusted to a room temperature 23±5° C. and a relative humidity of 50±5% for 72 hours, and then γ-ray of 25 kGy (average dose) was irradiated under room temperature conditions and under an air atmosphere. After irradiating, the state of syringe was further adjusted in a constant temperature room at room temperature 23° C.±0.5° C. and relative humidity 50±5% for 2 weeks, and then the measurement was performed.

(9) JIS T3210: 2011—Sterile Injection Syringes 6. Chemical Requirements—

With reference to this standard, the chemical requirements were tested by the following method.

(a) Preparation of 100 mm×120 mm×1 Mmt Press Sheet

A spacer for obtaining a 100 mm×120 mm×1 mmt press sheet was placed between 150 mm×150 mm×3 mmt aluminum plates, and a specified amount of pellets was placed in the frame of the spacer. Then, using a heating press heated to 230° C., the pellets were melted in the heating press machine without applying pressure for the first 7 minutes, and then a pressure of 100 kg/cm$^2$ was applied for 3 minutes. Thereafter, the sample was immediately transferred to a cooling press at 30° C. and a pressure of 150 kg/cm$^2$ was applied for 2 minutes to cool the sample. Then, the press sheet was released from the aluminum plate and the spacer and taken out.

(b) Preparation of Test Piece for Elution Test

The press sheet prepared in (a) was evenly divided into four with scissors, and four sheets of 60 mm×50 mm×2 mmt were collected. Then, the sheet surface and the cut surface were washed with distilled water and dried at room temperature to obtain a test piece for an eluate test.

(c) Radiation Sterility of the Test Piece

After irradiating the test piece with γ-rays of 25 kGy (average dose) under air atmosphere and room temperature conditions, the state of the test piece was adjusted in a constant temperature room with a room temperature of 23° C.±0.5° C. and a relative humidity of 50±5% for 2 weeks.

(d) Preparation of Test Solution 250 ml of distilled water was placed in a 500-ml glass beaker made of borosilicate, which was washed with distilled water and dried at room temperature. Four test pieces (60 mm×50 mm×2 mmt) for the eluate test prepared in (C) were put therein and immersed in water. At that time, no bubbles remained on the surface of the test piece. Then, the beaker was sealed with aluminum foil and kept at 37° C. for 8 hours in a constant temperature bath, and then the test piece was taken out and used as a test solution.

(E) pH Test, Elution Metal Test

The test was carried out according to the method described in JIS T3210: 2011. Distilled water was used as the blank test solution, and the eluted metal was analyzed by the atomic absorption spectrophotometric method.

The criteria for each test result are as follows. The suitability was evaluated.

(i) ΔpH: The difference in pH between the test solution and the blank test solution is 1 or less.

(ii) The total amount of the eluted metals: lead, zinc and iron is 5 mg/L or less and the cadmium content of the test solution is 0.1 mg/L or less when the cadmium measured value of in the test solution is corrected with the cadmium measured value of the blank test solution.

(10) Yakuhatsu No. 494 Dialysis Artificial Kidney Device Approval Criteria, IV Blood Circuit Quality and Test Method Currently, "Yakuhatsu No. 494 Dialysis Artificial Kidney Device Approval Criteria" is "Abolition of notification". However, since this test is a guideline for confirming the chemical safety in this application, the test was conducted.

Heavy metal tests, lead tests, and cadmium tests (collectively referred to as ashing tests) were conducted using pellets in accordance with the operating method of the approval criteria. The pellets used in the test were sterilized by irradiation with γ-rays of 25 kGy (average dose) 2 weeks before the main test, and the state was adjusted in a constant temperature room at room temperature of 23° C.±0.5° C. and relative humidity of 50±5% for 2 weeks.

In addition, the eluate test was carried out with reference to the eluate test described on 'V the quality and test method of the dialyzer, 5. the support and blood connection tube within this approval standard, by adding 150 ml of water to 15 g of pellets, and then performing an extraction test at 70° C. for 1 hour in compliance with the operation methods of the approval standard for each test. The pellets used in the test were sterilized by irradiation with γ-rays of 25 kGy (average dose) at 2 weeks before this test, and the state of the pellets was adjusted in a constant temperature room at room temperature of 23° C.±0.5° C. and relative humidity of 50±5% for 2 weeks.

The criteria for each test result are as follows. The suitability was evaluated.

4. Heavy metal test: 10 μg/g or less
5. Lead test: 1 μg/g or less
6. Cadmium test: 1 μg/g or less
8. Eluent test
   (i) Appearance: colorless and transparent, no foreign matter
   (ii) Foaming property: disappears within 3 minutes
   (iii) ΔpH: difference from blank is 1.5 or less
   (iv) Zinc: standard solution (0.5 μg/g) or less
   (v) Potassium permanganate ($KMnO_4$) reducing substance: Difference in consumption of potassium permanganate from standard solution is 1.0 ml or less.
   (vi) Evaporation residue: 1.0 mg or less
   (vii) Ultraviolet absorption spectrum (UV) at 220-350 nm: 0.1 or less \*) Currently, "Yakuhatsu No. 494 Dialysis Artificial Kidney Device Approval Criteria" is "Abolition of notification". However, since this test is a guideline for confirming the chemical safety in this application, the test was conducted.

TABLE 1

|  |  |  | Unit | Examples 1 | 2 | 3 | 4 | 5 | 6 | Comparative Examples 1 |
|---|---|---|---|---|---|---|---|---|---|---|
| Propylene-based polymer (A) | Preparation Example | | — | A-1 | A-2 | A-3 | A-4 | A-5 | A-6 | A-7 |
| | Blending amount | | part by mass | 93 | 93 | 93 | 90 | 95 | 90 | 90 |
| | Propylene-ethylene copolymer (a) | Weight | % by mass | 93 | 93 | 93 | 93 | 93 | 95 | 100 |
| | | Ethylene content | % by mass | 1.8 | 1.8 | 1.8 | 2.3 | 3.0 | 2.3 | 1.8 |
| | | MFR (230° C.) | g/10-min | 45 | 45 | 45 | 45 | 45 | 45 | 45 |
| | Propylene-ethylene copolymer (b) | Weight | % by mass | 7 | 7 | 7 | 7 | 7 | 5 | — |
| | | Ethylene content | % by mass | 18.0 | 19.0 | 21.0 | 21.0 | 21.0 | 21.0 | — |
| | | MFR (230° C.) | g/10-min | 7.0 | 3.0 | 5.0 | 5.0 | 5.0 | 5.0 | — |
| Elastomer (B) | Ethylene-α-olefin copolymer | Preparation Example | — | B-1 | B-1 | B-1 | B-1 | B-2 | B-1 | B-1 |
| | | Blending amount | part by mass | 7 | 7 | 7 | 10 | 5 | 10 | 10 |
| | | MFR (190° C) | g/10-min | 15 | 15 | 15 | 15 | 20 | 15 | 15 |
| | | Density | kg/m³ | 903 | 903 | 903 | 903 | 883 | 903 | 903 |
| Weather resistant stabilizer | | | part by mass | 0.04 | 0.04 | 0.04 | 0.04 | 0.04 | 0.04 | 0.04 |
| Nucleating agent | Type | | — | | | NX8000J | | | | NX8000J |
| | Content | | part by mass | 0.4 | 0.4 | 0.4 | 0.4 | 0.4 | 0.4 | 0.4 |

|  |  |  | Unit | Comparative Examples 2 | 3 | 4 | 5 | 6 | 7 | 8 |
|---|---|---|---|---|---|---|---|---|---|---|
| Propylene-based polymer (A) | Preparation Example | | — | A-8 | A-9 | A-10 | A-11 | A-12 | A-13 | A-14 |
| | Blending amount | | part by mass | 93 | 100 | 80 | 97 | 97 | 93 | 93 |
| | Propylene-ethylene copolymer (a) | Weight | % by mass | 93 | 91 | 92 | 88 | 92 | 93 | 93 |
| | | Ethylene content | % by mass | 1.8 | 2.3 | 0 | 1.8 | 2.2 | 1.8 | 1.8 |
| | | MFR (230° C.) | g/10-min | 45 | 45 | 180 | 45 | 45 | 45 | 45 |
| | Propylene-ethylene copolymer (b) | Weight | % by mass | 7 | 9 | 8 | 12 | 8 | 7 | 7 |
| | | Ethylene content | % by mass | 24.5 | 20.5 | 26.0 | 19.0 | 16.5 | 21.0 | 9.0 |
| | | MFR (230° C.) | g/10-min | 7.0 | 5.0 | 5.0 | 5.0 | 3.0 | 5.0 | 8.0 |

TABLE 1-continued

| | | | | | | | | | | |
|---|---|---|---|---|---|---|---|---|---|---|
| Elastomer (B) | Ethylene-α-olefin copolymer | Preparation Example | — | B-1 | — | B-3 | B-1 | B-2 | B-1 | B-1 |
| | | Blending amount | part by mass | 7 | — | 20 | 3 | 3 | 7 | 7 |
| | | MFR (190° C) | g/10-min | 15 | — | 4 | 15 | 20 | 15 | 15 |
| | | Density | kg/m$^3$ | 903 | — | 913 | 903 | 883 | 903 | 903 |
| Weather resistant stabilizer | | | part by mass | 0.04 | 0.04 | — | 0.04 | 0.04 | — | 0.04 |
| Nucleating agent | | Type | — | NX8000J | | NA-21 | | NX8000J | | |
| | | Content | part by mass | 0.4 | 0.3 | 0.2 | 0.4 | 0.3 | 0.4 | 0.4 |

TABLE 2

| | | | Unit | Examples | | | | | | Comparative Examples | | | | | | | |
|---|---|---|---|---|---|---|---|---|---|---|---|---|---|---|---|---|---|
| | | | | 1 | 2 | 3 | 4 | 5 | 6 | 1 | 2 | 3 | 4 | 5 | 6 | 7 | 8 |
| <Physical properties> | | | | | | | | | | | | | | | | | |
| Before sterility with 25 kGy γ-ray | MFR | | g/10-min | 26 | 30 | 27 | 28 | 28 | 30 | 42 | 34 | 27 | 60 | 22 | 25 | 29 | 32 |
| | Tensil Modulus | | MPa | 1180 | 1250 | 1250 | 1230 | 1100 | 1250 | 1490 | 1380 | 1270 | 1250 | 1060 | 1210 | 1250 | 1300 |
| | Weight Drop Test (10° C.) | 10-mL Syringe | cm | 150 | 150 | 100 | 150 | 150 | 150 | 20 | 40 | 5 | 150 | 100 | 10 | 150 | 10 |
| | Light transmittance in water | 10-mL Syringe | % | 70 | 70 | 70 | 70 | 71 | 70 | 67 | 66 | 50 | 45 | 67 | 62 | 70 | 70 |
| After sterility with 25 kGy γ-ray | Tensil Modulus | | MPa | 1200 | 1270 | 1270 | 1250 | 1120 | 1270 | 1510 | 1400 | 1290 | 1270 | 1080 | 1230 | 1270 | 1320 |
| | Weight Drop Test (10° C.) | 10-mL Syringe | cm | 20 | 10 | 10 | 10 | 10 | 10 | ≤5 | 10 | ≤5 | ≤5 | 10 | ≤5 | ≤5 | ≤5 |
| | Light transmittance in water | 10-mL Syringe | % | 70 | 70 | 70 | 70 | 71 | 70 | 67 | 66 | 50 | 45 | 67 | 62 | 70 | 70 |
| Elusion after sterility with 25 kGy γ-ray | Elute Test*[1] | Propriety | — | Yes | Yes | Yes | Yes | Yes | Yes | Yes | Yes | Yes | Yes | Yes | Yes | Yes | Yes |
| | Ashing Test*[2] | Propriety | — | Yes | Yes | Yes | Yes | Yes | Yes | Yes | Yes | Yes | Yes | Yes | Yes | Yes | Yes |
| | Elute Test*[2] | Propriety | — | Yes | Yes | Yes | Yes | Yes | Yes | Yes | Yes | Yes | Yes | Yes | Yes | Yes | Yes |
| <Molding evaluation of 10-mL syringe> | | | | | | | | | | | | | | | | | |
| High speed moldability | Cycle time | | sec. | 15 | 15 | 15 | 17 | 17 | 17 | 15 | 15 | 15 | 23 | 21 | 15 | 15 | 15 |

*[1]JIS T3210: 2011 -Sterile injection syringes 6. Chemical Requirements-
*[2]Yakuhatsu No. 494 Dialysis Artificial Kidney Device Approval Criteria, IV Blood Circuit Quality and Test Method

The invention claimed is:

1. An injection-molded article for medical use obtained by using a medical propylene-ethylene-based resin composition,
wherein the medical propylene-ethylene based resin composition comprises:
88 to 95 parts by mass of propylene-ethylene resin composition (A) that contains from 91% by mass and ≤97% by mass of a propylene-ethylene copolymer (a) having an ethylene content of 1 to 5% by mass, and a melt flow rate (MFR) conforming to JIS K7210 (230° C., 2.16 kg load) of 10 to 100 g/10-min, and ≥3% by mass and ≤9% by mass of a propylene-ethylene copolymer (b) having an ethylene content of 15 to 22% by mass and an MFR of 1 to 50 g/10-min, (which is the proviso that the total of (a) and (b) is 100% by mass),
5 to 12 parts of an elastomer (B) that is an ethylene-α-olefin random copolymer having a density of 0.880 to 0.920 g/cm$^3$ (with the proviso that the total of (A) and (B) is 100 parts by mass); and
0.01 to 0.20 parts by mass of a weather-resistant stabilizer, and wherein the injection-molded article has been sterilized by γ-rays or an electron beam.

2. The injection-molded article for medical use according to claim 1, wherein the elastomer (B) is an ethylene-α-olefin random copolymer polymerized using a metallocene catalyst and having an MFR of 1 to 100 g/10-min in accordance with JIS K7210 (190° C., 2.16 kg load).

3. The injection-molded article for medical use according to claim 1, wherein the medical propylene-ethylene-based resin composition further comprises a nucleating agent.

4. The injection-molded article for medical use according to claim 1, wherein the lower limit of the mass ratio of the propylene-ethylene copolymer (a) is 93% by mass and the upper limit of the mass ratio of the propylene-ethylene copolymer (b) is 7% by mass.

* * * * *